Oct. 9, 1962 H. G. THRASHER 3,057,592
IRROTATIONAL MOUNT
Filed Oct. 12, 1959 2 Sheets-Sheet 1

INVENTOR:
Howard G. Thrasher
By Richard K. Ehrlich
Attorneys

Oct. 9, 1962 H. G. THRASHER 3,057,592
IRROTATIONAL MOUNT
Filed Oct. 12, 1959 2 Sheets-Sheet 2

INVENTOR:
Howard G. Thrasher
By Richard H. Ehrlich
Attorney.

3,057,592
IRROTATIONAL MOUNT
Howard G. Thrasher, Long Beach, Calif., assignor to Litton Industries of California, Beverly Hills, Calif.
Filed Oct. 12, 1959, Ser. No. 846,003
9 Claims. (Cl. 248—358)

The present invention relates to an irrotational mount for isolating a platform mounted thereon from vibratory displacement and more particularly to an irrotational mount for isolating a platform mounted thereon from vibratory displacement having elongated hollow members operable in response to the vibratory displacement to vary their interior angles to take up the displacement.

In many systems and devices in current use it is necessary to isolate a platform from vibrations as well as to insure that the platform maintains a constant angular orientation with respect to a predetermined reference. For example, the inertial platform of an inertial navigation system must be mounted within the vehicle whose position is to be determined in such a manner that vibrations of the vehicle are not transmitted to the inertial platform and also in such a manner that the inertial platform experiences no rotational movement with respect to the vehicle, or, in other words, the angular orientation of the platform with respect to the vehicle is continually maintained. The importance of the isolating requirements of an inertial platform becomes clear when it is realized that the gyroscopes and the accelerometers mounted on the platform rectify high frequency vibration applied thereto so that a spurious output signal is generated by these components in response to vibratory displacement whereby the accuracy of the navigational system is severely limited. Further, it is clear that unless the angular orientation of the platform is maintained, inaccurate accelerations will be sensed thereby also severely limiting the accuracy of the system.

As would be expected, many different types of mounting devices have been developed in the prior art to overcome the foregoing described accuracy limitations. However, with one exception, the prior art mounting devices are incapable of isolating the platform affixed to the mount, and in addition, in preserving the angular orientation of the platform with respect to the vehicle to which it is mounted. The one exception is an irrotational mount disclosed in co-pending U.S. patent application, Serial No. 823,163, for "Precision Irrotational Mount," filed on June 26, 1959, by Howard G. Thrasher, now Patent No. 2,971,383. Briefly, in this mount the platform carriage and base plate of the mount are connected by means of a pivotably joined parallelogram which is pivotably coupled to the base plate and platform carriage by a pair of quadrilateral flexure plates having parallel opposite sides, a predetermined side of each of the flexure plates being oriented substantially perpendicular to the plane of the pivotably jointed parallelogram and affixed to the base plate, the side of each flexure plate opposite the predetermined side being pivotably coupled to the platform carriage in such an orientation that the flexure plates are mutually orthogonal. By use of the foregoing described structure a platform can be isolated from vibratory displacement and prevented from changing its angular orientation with respect to the base. However, the foregoing structure is somewhat bulky and relatively heavy so that in a limited number of applications where size and weight are critical, this irrotational mount cannot be used. Hence, in applications where size and weight are critical there is no useful prior art mounting device which is capable of isolating a platform affixed thereto and which is further operable to preserve the angular orientation of the platform with respect to the base for which it is mounted.

The present invention, on the other hand, provides a compact, light weight irrotational mount which is capable of substantially isolating the platform mounted thereon from vibratory displacement. In accordance with the concepts of the invention the mount includes a plurality of elongated hollow members having two pairs of parallel opposite sides, the hollow members being responsive to vibratory displacement of a base member for varying their interior angles to thereby take up the displacement in order to isolate the platform from the vibratory displacement. In addition, the stiffness or rigidity of the sides of the hollow members is sufficient to prevent angular movement of the platform with respect to the base so that the angular orientation of the platform is constantly maintained.

In accordance with a preferred embodiment of the invention, the irrotational mount includes a base plate coupled to a vehicle or base, a platform support for mounting the platform thereon, and a parallelogram shaped structure intercoupling the platform support and the base plate, the parallelogram shaped structure including a plurality of four elongated hollow members, each including two pairs of substantially parallel opposite sides. The hollow members of the parallelogram shaped structure are responsive to vibratory displacement of the base member for changing the magnitude of their interior angles and in addition to vary the distance between a pair of opposite sides to take up the displacement whereby the platform remains unaffected by the vibratory displacement. Further, the rigidity of the sides of the hollow members insures that the platform will be unable to change its angular position with respect to the frame or base member. In this regard, it should be noted that it is desirable to corrugate or rib the sides of the hollow members to further strengthen the sides so that they are better able to prevent rotation.

It is therefore an object of the present invention to provide a compact lightweight precision irrotational mount for isolating a platform from vibratory displacement.

It is another object of the present invention to provide an irrotational mount including a parallelogram shaped structure having a plurality of four elongated hollow members as sides.

It is a further object of the present invention to provide an irrotational mount which is compact in design and has an elongated hollow member having parallel opposite sides capable of varying its interior angles in response to vibratory displacement to take up the vibratory displacement and thereby isolate a platform mounted thereon.

It is a further object of the present invention to provide an irrotational mount including a parallelogram shaped structure having a plurality of elongated hollow members as sides, each of the hollow members including two pairs of parallel opposite sides, the parallelogram shaped structure being operable in response to vibratory displacement to vary its interior angles and to vary the distance between at least a pair of the opposite sides.

It is still another object of the present invention to provide an irrotational mount including elongated hollow members having parallel opposite sides, each of said sides being corrugated to present rigid surfaces which resist angular motion of the platform with respect to the base upon which it is mounted.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
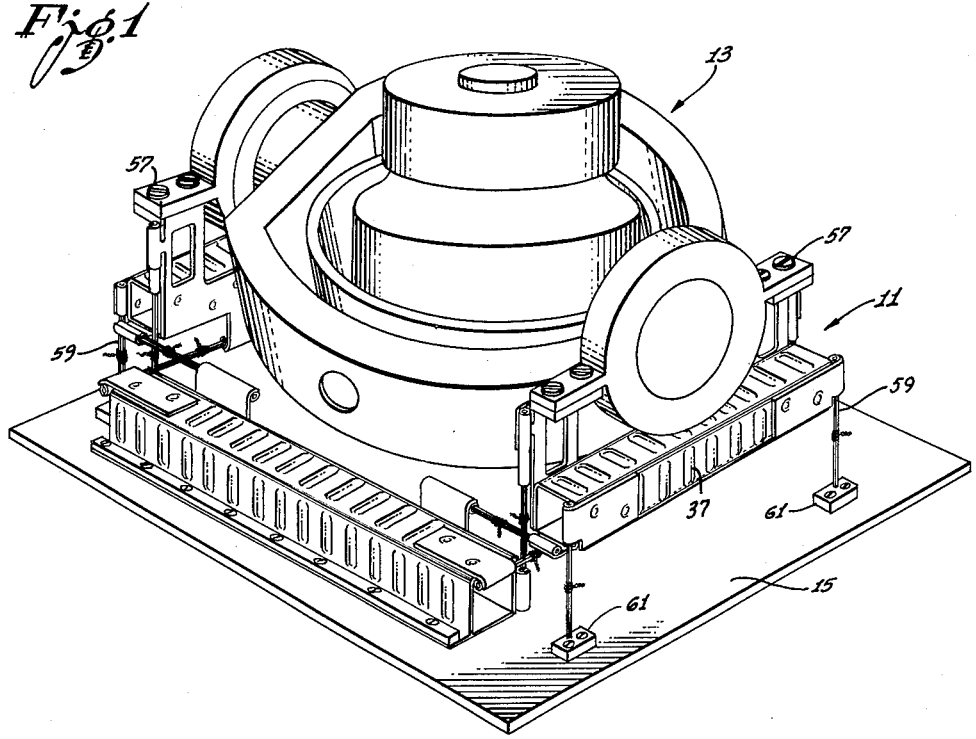
FIGURE 1 is a three dimensional view of an irrotational mount of the invention with an inertial platform mounted thereon.

Referring now to the drawings wherein like or corresponding parts are designated by the same reference characters throughout the several views, there is shown in FIGURE 1 a three dimensional view of an irrotational mount 11 of the invention with an inertial platform 13 mounted thereon. As shown in FIGURE 1, inertial platform 13 is coupled to a frame or base 15 by means of the irrotational mount whereby vibratory displacements of base 15 are taken up by the mount so that the inertial platform remains undisturbed thereby. Further, mount 11 functions in such a manner that the angular orientations of platform 13 remain constant with respect to the frame.

Figure 2:
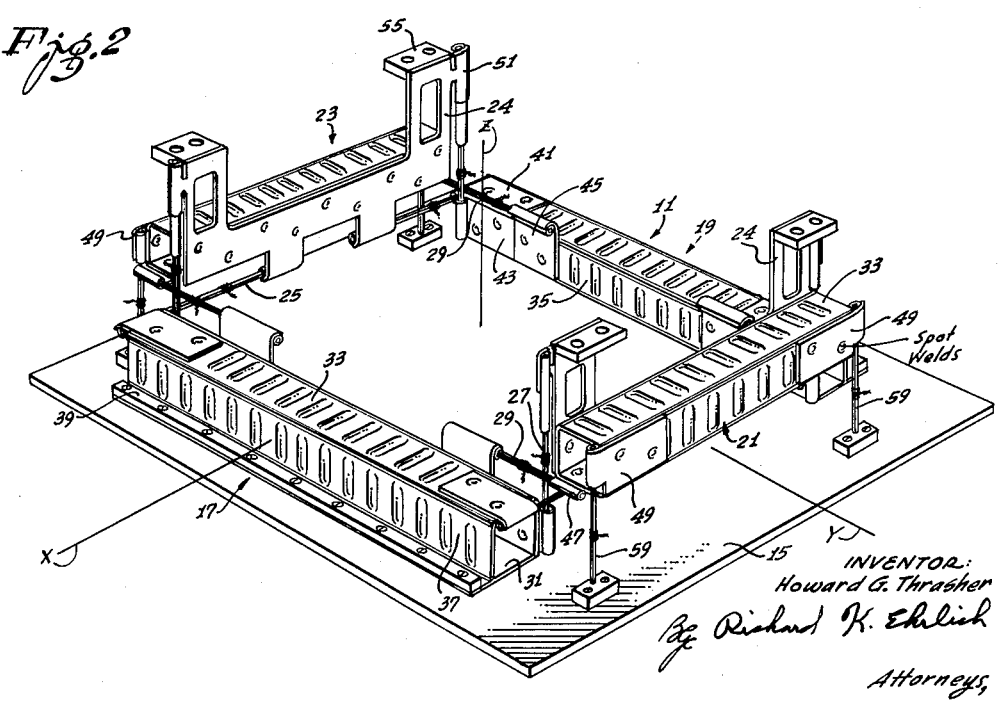
FIGURE 2 is a three dimensional view of the mount of FIGURE 1 without the platform mounted thereon.

Directing attention now to FIGURE 2, wherein there is shown a detailed view of mount 11 without platform 13 mounted thereon, it is clear that mount 11 includes a parallelogram shaped structure having as sides four elongated hollow members 17, 19, 21 and 23 each of which has four sides forming two pairs of parallel opposite sides. Hence the hollow members take the form of open ended parallelepiped structures. In addition, the mount includes a pair of U-shaped flexible platform supports 24 coupled to hollow members 21 and 23 upon which platform 13 is mounted.

Referring with particularity to the parallelogram shaped structure it is apparent that elongated hollow members 17 and 19 are displaced from each other and positioned in parallel while hollow members 21 and 23 are displaced from each other and positioned in parallel so that when the ends of the elongated hollow members are coupled to each other there results the parallelogram shaped structure. In connection with the foregoing intercoupling, it is clear from FIGURE 2 that each of the elongated hollow members 17 and 19 has one of its ends connected to hollow member 21 and the other ends connected to hollow member 23, each connection being accomplished by means of a plurality of three flexible connectors 25 and 27 and 29.

Referring now in detail to the elongated hollow members it is clear from FIGURE 2 that the hollow members include four sides 31, 33, 35, and 37; sides 31 and 33 being opposite each other and parallel while sides 35 and 37 are opposite each other and parallel. Further, sides 31 of the members are positioned adjacent to and substantially parallel with the surface of base 15 and sides 35 of members 17 and 19 are positioned adjacent sides 35 of members 21 and 23.

As is evident from the simplicity of construction of the hollow members they may be mechanized in a number of ways. However, in choosing a method of mechanization or construction of the hollow members it should be remembered that the sides should be constructed with sufficient rigidity so that they maintain a planar surface, regardless of stress. Further, it should be remembered that the hollow members must be so constructed that they are free to vary the interior angles of the members.

One suitable method of constructing the hollow members is to form the four sides of the hollow members by taking a rectangular sheet of full hard stainless steel having a thickness of, for example, .005 inch and bending it over to take the form of a parallelepiped. It should be noted in connection with the construction of hollow members 17 and 19 that they are folded over in a slightly different manner so that a flange area 39 will appear adjacent the elongated edges or corners of the member joining sides 31 and 37. As will be hereinafter discussed, hollow members 17 and 19 are secured to frame 15 by passing bolts or rivets through a number of apertures formed on the flange area for that purpose.

As shown in FIGURE 2, in order to insure sufficient rigidity of the sides so that they will remain planar, the sides are further bent or stamped to have ribs or corrugations formed therein. It should be noted that as an alternative to forming ribs in the sides of the hollow members a piece of metal of sufficient thickness, for example, .015 inch, can be spot welded or otherwise attached to the sides of the hollow members.

As shown in FIGURE 2, in order to complete the construction of hollow members 17 and 19, there are attached thereto a plurality of three pairs of cable alignment and support members 41, 43, and 45, one member of each pair being positioned at each end of the members. Further, as shown in FIGURE 2, there are attached to hollow members 21 and 23 a plurality of two pairs of cable alignment and support members 47 and 49, one member of each pair being located at one of the ends of the hollow members. As will be immediately apparent to one skilled in the art, the cable alignment and support members can be attached to the hollow members in numerous ways. As is indicated in the figures, one suitable method for attaching the alignment and support members is to spot weld them to the sides of the hollow members. Turning to a more detailed discussion of the manner of interconnecting the hollow members, attention is directed to FIGURE 3 wherein the manner of interconnection is clearly depicted.

Figure 3:
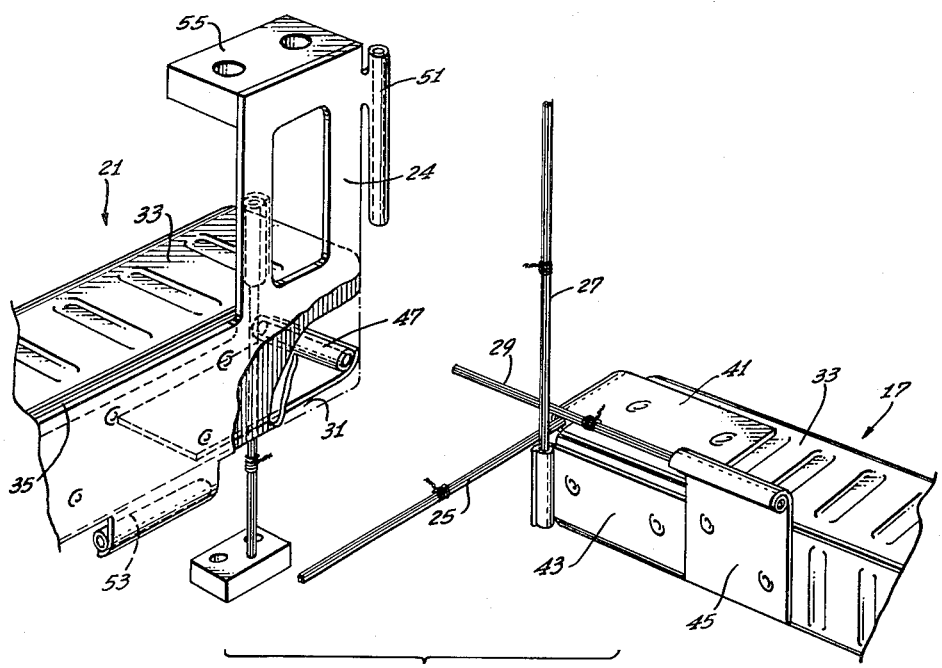
FIGURE 3 is an exploded three-dimensional view of a portion of the mount of FIGURE 1.

Referring now to FIGURE 3 wherein therein is shown an exploded three-dimensional view of a portion of the parallelogram shaped structure which clearly discloses the manner of connection between hollow members 17 and 21, the manner of interconnection of hollow members 17 and 23, 19 and 21, and 19 and 23 being identical As shown in FIGURE 3, cable alignment and support member 41 is affixed to side 33 of hollow member 17 in such a manner that it is capable of accepting flexible connector 25 which is oriented parallel with the elongated axis of hollow member 21 and perpendicular to the elongated axis of hollow member 17. Further, cable alignment and support member 43 is connected to side 35 of hollow member 17 in such a manner that it is capable of accepting flexible connector 27 which is oriented perpendicular to the elongated axes of hollow members 17 and 21 while cable alignment and support member 45 is also connected to side 35 of member 17 in such a manner that it is capable of accepting flexible connector 29 which is oriented parallel with the elongated axis of member 17 and perpendicular to the elongated axis of member 21. Directing attention to the cable alignment and support member affixed to member 21, it is clear from FIGURE 3 that cable alignment and support member 47 is affixed to side 31 of member 21 in such a manner that it is capable of accepting flexible connector 29.

As is apparent from FIGURE 3, platform support 24 which is rigidly affixed to side 35 includes thereon a pair of cable alignment and support members 51 and a pair of cable alignment and support members 53, only one of each pair of support members being visible in FIGURE 3, the visible members 51 and 53 accepting flexible connectors 27 and 25, respectively. Hence, flexible connector 27 interconnects support members 43 and 51 while flexible connector 25 interconnects support members 41 and 53.

Considering the flexible connectors in detail, it should be noted that they should be constructed from a material that is flexible but yet presents a rigid or stiff body to forces directed along their longitudinal axes. One suitable material for use as the flexible connectors has been found to be strands of piano wire. For example, particularly good results have been obtained with piano wire having a diameter of .015 inch. It should be noted that it has been found desirable to band together the different strands of wire by circumscribing the wire at frequent intervals with small strands of wire so that the flexibility of the connector is guaranteed. It is clear, of course, that binding together the individual wires comprising each flexible conductor prevents the individual wires from separating and bending individually in a non-uniform manner whereby the wires resist flexure as a group. In the particular embodiment described herein the flexible connectors were secured to the cable alignment and support members by spot welding the cables thereto. However, numerous other methods of securing the flexible connectors to the support members will be apparent to one skilled in the art.

As is indicated in FIGURE 3, platform 13 is mountable on mount 11 by means of a plurality of four mounting stations 55, which are formed at the ends of the two legs of each of the two U-shaped supports 24, one of the supports being shown in FIGURE 3. For a better view of the supports and the manner of mounting platform 13, attention is again directed to FIGURE 1.

Referring to FIGURE 1, it is apparent that the platform is secured to mount 11 by a plurality of screws 57 which affix the platform to the four mounting stations 55. It should be noted that the structure of platform 13 is sufficient to maintain the mounting stations located on one of the support members 24 a constant predetermined distance from the mounting stations located on the other of the support members, the significance of this fact along with the property that platform supports 24 be somewhat flexible is hereinafter discussed.

Referring now specifically to the manner in which mount 11 is secured to base 15 it should again be noted that flange areas 39 of hollow members 17 and 19 are secured to base 15 by means of a plurality of screws or rivets which pass through apertures in the flange area. As shown in FIGURE 2, sides 37 of hollow members 21 and 23 are secured to base 15 at their ends by a plurality of four flexible connectors 59, similar to the connectors hereinbefore described. As shown in FIGURE 2, each of the flexible connectors 59 is spot welded at one end to cable alignment and support member 49 and at the other end to an aperture in a mounting foot 61 which is in turn affixed to base 15.

Considering now the operation of mount 11 to isolate platform 13 from vibratory displacement experienced by base 15, attention is again directed to FIGURE 2 and to the XYZ coordinate system superimposed over the platform shown therein. As is clear from FIGURE 2, when the sides are not subject to vibratory displacement, the X and Y axes are perpendicular to the sides 37 of hollow members 17 and 21, respectively, while the Z axis is substantially perpendicular to sides 33 of the hollow members. Considering now vibratory displacement of base 15 oriented along the X axis it is clear that side 31 is unable to move in response thereto since it is secured to base 15, however, side 33 is capable of moving along the X axis since the hollow member is constructed so that its interior angles can vary. Further, it is clear since sides 35 and 37 remain susbtantially parallel that as side 33 moves to change the cross sectional area of the hollow member from that of a rectangle to that of a rhombus the distance between sides 31 and 33 varies. Hence, relative movement along the X axis is possible between sides 31 and 33 of members 17. It is clear that the interior angles of hollow member 19 must vary in the same manner as the interim angles of hollow members 17 since sides 33 of members 17 and 19 are so affixed to hollow members 21 and 23 that side 33 of hollow member 19 must experience the same movement along the X axis as side 33 of hollow member 17. Hence, by variation of the interior angles of the members, the vibratory displacement of base 15 is taken up and not transmitted to platform 13 whereby the platform remains stationary and thus is isolated from the vibratory displacement.

In a similar manner vibratory displacement directed along the Y axis causes relative movement between sides 31 and 33 of members 21 and 23 in order to take up the displacement so that the platform remains stationary and is thus isolated from the displacement. It should be noted that during the course of movement between sides 31 and 33, sides 35 of members 21 and 23 vary from a position substantially parallel with the Z axis. However, this variation does not introduce a rotation of the platform with respect to the base since as hereinbefore stated platform supports 24 are flexible and the platform itself is capable of maintaining constant the distance between the mounting stations so that the platform supports bend sufficiently to insure that no angular variation of the platform with respect to the base is experienced.

Considering now the effect of vibratory displacement along the Z axis. The reason for stating hereinbefore that sides 31 of members 17 and 19 are substantially parallel to the surface of frame 15 rather than completely paralell should be discussed. The reason for the foregoing is that in the preferred embodiment of the invention while the edge of side 31 adjacent flange 39 is in contact with frame 15, the other elongated edge of side 31 is removed a few thousandths of an inch from the surface of the frame so that side 31 is substantially but not perfectly parallel with the surface of frame 15. This orientation of side 31 becomes important when the vibratory displacement of frame 15 directed along the Z axis is applied to mount 11 since the elongated edge of side 31 positioned a few tenths of an inch from the surface of base 15 is free to move closer to or further away from the surface of base 15. Thus, the vibratory displacement can be taken up and not transmitted to platform 13. In addition, it should be noted that vibratory displacement directed along the Z axis can also be taken up by the mount through the variation of the interior angles of hollow members 17, 19, 21 and 23 in such a manner that the distance between sides 31 and 33 vary. Hence, it is not absolutely necessary in accordance with concepts of the invention that side 31 be slightly out of parallel with the surface of the base.

In view of the foregoing discussion of the operation of mount 11, it is clear that the amount is capable of taking up the vibratory displacement directed along the X, Y, and Z axes, whereby platform 13 mounted thereon is completely isolated from any vibratory displacement of base 15.

Turning attention now specifially to the operation of mount 11, to insure that the angular orientation of platform 13 is continually maintained with respect to the base 15 regardless of the application of forces tending to disrupt the angular orientation of the platform, the operation of the platform to prevent angular rotation about the X axis will be considered.

First, remembering that the sides of hollow members 17 and 19, as well as 21 and 23, are rigid so that the opposide sides of the hollow members remain planar and parallel within the stress limits of the mount it is clear that side 33 of member 17 cannot rotate about the X axis with respect to side 31 of member 17 while side 33 of member 19 cannot rotate with respect to side 31. It should be noted that while it is clear in view of the foregoing that the elongated edge or corner of member 21 connected to members 17 and 19 is positioned the same distance from frame 15 as is the corresponding edge of member 23 through the action of the flexible connectors, the distance is variable and is dependent upon the distance between the base and the movable edge of sides 31 of members 17 and 19. It is clear, of course, that the other elongated corner of member 21, as well as the corresponding corner of member 23 is maintained, as long as sides 33 of members 17 and 19 do not experience movement along the X axis, a constant predetermined distance from base 15 by connectors 59 so that members 21 and 23 tend to rotate about their elongated axes as the distance between the base and the movable edge of sides 31 of members 17 and 19 change in response to vibration along the Y axis. However, as has been hereinbefore explained, this rotation does not cause platform 13 to rotate since platform supports 24 are flexible and the platform itself is capable of maintaining the mounting stations of the platform supports at constant distances from each other.

Considering the manner of operation of mount 11 to prevent rotation of platform 13 about the Y axis it is clear that the platform 13 cannot rotate about the Y axis since sides 37 of members 21 and 23 cannot rotate about the Y axis due to connectors 59. It is clear that if sides 37 of members 21 and 23 cannot rotate about the Y axis the platform supports cannot rotate. Hence, the angular orientation of the platform about the Y axis must be preserved.

Considering now the operation of mount 11 to prevent rotation of platform 13 with respect to base 15 about the Z axis, it is clear since sides 31 of the hollow members are securely fixed in orientation to base 15 and since sides 33 of the hollow members must remain parallel with their corresponding sides 31 that platform 13 is unable to rotate about the Z axis. Hence, it is clear in view of the foregoing discussion that the angular orientation of platform 13 is completely preserved about the X, Y, and Z axes so that mount 11 is operable to completely isolate platform 13 from vibratory displacement of base 15 and yet maintain platform 13 irrotational. Accordingly, it is apparent that sides 17 and 19 preserve angular orientation relative to angular rotation about the X and Z axes while sides 21, 23 preserve angular orientation relative to angular rotation about the Y axis.

It is to be expressly understood that numerous modifications and alterations may be made in the irrotational mount herein disclosed without departing from the concepts of the invention. Accordingly, it is to be expressly understood that the scope of the invention is to be limited only by the spirit of the appended claims.

What is claimed as new is:

1. An irrotational mount positioned on a base plate for isolating an inertial platform coupled to the mount from vibration experienced by the base plate, said mount comprising: a parallelogram shaped structure having a plurality of first, second, third, and fourth elongated hollow members as sides, each of said hollow members including first and second pairs of substantially parallel opposite sides movable relative to each other for varying the interior angles of each of said hollow member, said parallelogram-shaped structure further including first coupling means for coupling said first and second members to the base plate and second coupling means for intercoupling said third and fourth members to said first and second members to preserve the relative mobility of the parallel sides of said hollow members; and coupling apparatus for connecting the inertial platform to said third and fourth members.

2. The combination defined in claim 1 wherein said coupling apparatus includes a pair of first and second flexible platform supports, one of said supports coupling said third hollow member to the platform and the other coupling said fourth hollow member to the platform.

3. The combination defined in claim 2 wherein said sides of said hollow members are ribbed to strengthen the sides.

4. In an irrotational mount positioned on a base member for isolating a platform coupled to the mount from vibratory displacement of the base member, the combination comprising: a base member defining a base plane; first and second elongated hollow members displaced from each other and positioned substantially parallel to each other, each of said hollow members having first and second pairs of substantially parallel opposite sides, said opposite sides being moveable relative to one another; first coupling means for coupling said first and second members to said base member with each of said first pair of sides being positioned substantially perpendicular to the base plane; third and fourth elongated hollow members displaced from each other and positioned substantially parallel to each other and substantially orthogonal to said first and second members, each of said hollow members having first and second pairs of substantially parallel opposite sides, said opposite sides of each member being moveable relative to each other; and second coupling means for coupling a platform to said third and fourth hollow members; and third coupling means for coupling said third and fourth hollow members to said first and second hollow members to preserve the relative mobility of said pairs of opposite sides of said hollow members whereby said first and second hollow members are responsive to vibratory displacement to produce relative motion between the opposite sides of said hollow members, the vibratory displacement of the base being taken up and not transmitted to the platform while the angular orientation of the platform is preserved.

5. The combination defined in claim 4 wherein said sides of said hollow members are ribbed.

6. An irrotational mount positioned on a base plate for isolating an inertial platform coupled to the mount from vibration experienced by the base plate, said mount comprising: a parallelogram shaped structure having a plurality of first, second, third, and fourth elongated hollow members as sides, said first and second hollow members being opposite each other and said third and fourth hollow members being opposite each other, each of said hollow members including first and second substantially parallel opposite surfaces and third and fourth substantially parallel opposite surfaces, each of the elongated edges defined be the intersection of said first and third surfaces of said first and second hollow members being rigidly connected to the base with said third surface oriented substantially parallel to the surface of the base, said second surfaces of said first and second hollow members facing each other and being flexibly connected to said third surfaces of said third and fourth hollow members and said second surfaces of said third and fourth hollow members being flexibly coupled to the base with said third surfaces substantially parallel to the surface of the base, said first surfaces of said third and fourth hollow members facing each other; first and second flexible platform supporting members, said supporting members being rigidly affixed to the second surfaces of said third and fourth hollow members, respectively, the platform being mountable on said supports; and connecting means for flexibly connecting said fourth and second surfaces of said first and second hollow members to said supporting members.

7. In an irrotational mount positioned on a base for isolating an inertial platform coupled to the mount from vibratory displacement of the base, the combination comprising: first, second, third, and fourth elongated hollow members, each having first and second pairs of substantially parallel rigid opposite sides movable with respect to each other, said first and second members being positioned in parallel and said third and fourth members being positioned in parallel; first means for coupling said third and fourth members to the inertial platform; second means for intercoupling said first and second members to said third and fourth members to preserve the relative mobility of the sides of said members; and third means for coupling said first and second members to the base.

8. In an irrotational mount adapted for being positioned on a frame for isolating a platform from vibration experienced by the frame while preserving the angular orientation of the platform with respect to the frame, the combination comprising: a first elongated hollow member having parallel opposite sides and adapted for being connected to the frame with its direction of elongation substantially orthogonal to mutually perpendicular first and second predetermined directions, said first hollow member being responsive to vibration oriented along said first and second direction for varying the magnitudes of its interior angles; a second elongated hollow member having parallel opposite sides and adapted for being connected to the frame with its direction of elongation substantially perpendicular to said second predetermined direction, said second hollow member being responsive to vibration oriented along said second predetermined direction and the direction of elongation of said first hollow member for varying the magnitudes of its interior angles; and means for connecting said first hollow member to said second hollow member to preserve the variability of the magnitudes of the interior angles of said members.

9. A mount for intercoupling a platform to a base to isolate the platform from vibratory displacement of the base, said mount comprising: first and second elongated hollow members having substantially planar parallel opposite sides moveable with respect to each other in response to vibration of the base, said first and second hollow members being displaced from each other and being parallel to each other; third and fourth hollow members having substantially planar parallel opposite sides moveable with respect to each other in response to vibration of the base, said third and fourth hollow members being displaced from each other and being parallel to each other; and coupling means for intercoupling said hollow members to form a parallelogram shaped structure having the hollow members as sides, said coupling means preserving the relative mobility of the sides of said hollow members whereby vibratory displacement is taken up without varying the angular orientation of the platform with respect to the base.

References Cited in the file of this patent

UNITED STATES PATENTS

| | | |
|---|---|---|
| 1,788,081 | Brown | Jan. 6, 1931 |
| 2,526,413 | Rawlins | Oct. 17, 1950 |
| 2,797,916 | Pellarini | July 2, 1957 |
| 2,904,302 | Cavanaugh | Sept. 15, 1959 |
| 2,932,482 | Dickie | Apr. 12, 1960 |